(12) United States Patent
Tokoro

(10) Patent No.: US 11,117,615 B2
(45) Date of Patent: Sep. 14, 2021

(54) DRIVING AID CONTROL APPARATUS

(71) Applicant: DENSO CORPORATION, Kariya (JP)

(72) Inventor: Hirotaka Tokoro, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/683,585

(22) Filed: Aug. 22, 2017

(65) Prior Publication Data

US 2018/0057054 A1 Mar. 1, 2018

(30) Foreign Application Priority Data

Aug. 23, 2016 (JP) .............................. JP2016-162801

(51) Int. Cl.
*B60W 30/12* (2020.01)
*B62D 15/02* (2006.01)
(Continued)

(52) U.S. Cl.
CPC ........ *B62D 15/025* (2013.01); *B60K 31/0008* (2013.01); *B60R 11/04* (2013.01); *B60T 7/18* (2013.01); *B60T 7/22* (2013.01); *B60T 8/1755* (2013.01); *B60T 8/17557* (2013.01); *B60W 10/20* (2013.01); *B62D 6/002* (2013.01); *G06K 9/00791* (2013.01); *G06K 9/00805* (2013.01); *G08G 1/167* (2013.01);
(Continued)

(58) Field of Classification Search
None
See application file for complete search history.

(56) References Cited

U.S. PATENT DOCUMENTS 5,390,118 A * 2/1995 Margolis ............... G01S 17/931
   701/23
5,661,650 A * 8/1997 Sekine ..................... B62D 1/28
   340/438
(Continued)

FOREIGN PATENT DOCUMENTS

JP    H09-183383 A    7/1997
JP    2005-343260 A   12/2005
(Continued)

OTHER PUBLICATIONS

Espacenet translation of JP-2012020652-A Description from https://worldwide.espacenet.com/patent/ on Jul. 13, 2020 (Year: 2012).*

*Primary Examiner* — Adam D Tissot
*Assistant Examiner* — Laura E Linhardt
(74) *Attorney, Agent, or Firm* — Maschoff Brennan

(57) ABSTRACT

An apparatus for performing driving aid control to cause a travel trajectory of a mobile object to follow a setpoint trajectory (La) by transmitting a control command value ($\delta$) to a yaw moment controller capable of controlling a yaw moment of the mobile object. In the apparatus, a setpoint trajectory setter is configured to set the setpoint trajectory (La) of the mobile object. A control command value calculator is configured to calculate the control command value ($\delta$) based on an integrated value ($\delta I$) of a lateral error that is an error between a position of the mobile object and the setpoint trajectory. The control command value calculator is further configured to decrease the integrated value ($\delta I$) with decreasing a curvature ($\rho$) of a road on which the mobile object is traveling.

14 Claims, 15 Drawing Sheets

(51) Int. Cl.
  *B62D 6/00* (2006.01)
  *G01P 3/64* (2006.01)
  *B62D 1/00* (2006.01)
  *G01C 21/34* (2006.01)
  *G01D 1/04* (2006.01)
  *G05D 1/02* (2020.01)
  *B60T 8/1755* (2006.01)
  *B60T 7/18* (2006.01)
  *G06K 9/00* (2006.01)
  *B60K 31/00* (2006.01)
  *B60R 11/04* (2006.01)
  *B60T 7/22* (2006.01)
  *B60W 10/20* (2006.01)
  *G08G 1/16* (2006.01)

(52) U.S. Cl.
  CPC ... *B60T 2201/022* (2013.01); *B60T 2201/089* (2013.01); *G06T 2207/30261* (2013.01)

(56) References Cited

U.S. PATENT DOCUMENTS

| | | | |
|---|---|---|---|
| 6,212,453 B1* | 4/2001 | Kawagoe | B62D 15/025 701/41 |
| 9,573,593 B2* | 2/2017 | Terazawa | B60W 30/12 |
| 10,065,639 B2* | 9/2018 | Taniguchi | B62D 6/008 |
| 2015/0307125 A1* | 10/2015 | Kunihiro | B62D 6/02 701/42 |
| 2017/0061797 A1* | 3/2017 | Lee | B60K 31/0008 |
| 2018/0043870 A1* | 2/2018 | Nagae | B60T 8/17557 |

FOREIGN PATENT DOCUMENTS

| JP | 2012-020652 A | 2/2012 |
|---|---|---|
| JP | 2012020652 A * | 2/2012 |

\* cited by examiner

ROAD CURVATURE ρ

MAXIMUM CURVATURE ρmax

DECREMENTAL GAIN Kdgn ature (ρ) of a road on which the mobile
DRIVING AID CONTROL APPARATUS

CROSS-REFERENCE TO RELATED APPLICATION

This application is based on and claims the benefit of priority from earner Japanese Patent Application No. 2016-162801 filed Aug. 23, 2016, the description of which is incorporated herein by reference.

BACKGROUND

Technical Field

The present disclosure relates to a driving aid control apparatus.

Related Art

A driving aid apparatus disclosed in Japanese Patent Application Laid-Open Publication No. 2012-20652 applies a steering torque to a steering system to make a vehicle to travel following a target position. This driving aid apparatus includes a disturbance quantity acquirer and an integral controller. The disturbance quantity acquirer acquires a lateral disturbance quantity acting on the vehicle, such as a cross slope of a traveled road or wind. The integral controller integrates an error or deviation between the target position and a lateral position of the vehicle. In the driving aid apparatus disclosed in Japanese Patent Application Laid-Open Publication No. 2012-20652, a target steering torque is set based on an integrated value calculated by the integral controller. In addition, the integral controller resets the integrated value to zero at a time when a signature of the disturbance quantity changes, thereby suppressing a phase delay of integral control.

As above, the driving aid apparatus disclosed in Japanese Patent Application Laid-Open Publication No. 2012-20652 calculates a control command value, such as a target steering torque, based on the integrated value of lateral error. Such a configuration can enhance followability of the vehicle to a setpoint trajectory even in a situation where the error between the position of the vehicle and the setpoint trajectory is likely to increase, for example, in a situation where the vehicle is traveling around a curve. It is advantageous, in such a control method, that the integrated value is reset when the vehicle reaches a straight road. This can suppress a phase delay of integral control, which leads to enhanced followability.

However, resetting the integrated value when the vehicle reaches a straight road from a curve may lead to an abrupt change in the control command value, such as a target steering torque. Such an abrupt change in the control command value may cause an oscillatory change in the steering angle of the vehicle, which may cause the driver to feel discomfort.

In view of the above, a driving aid control apparatus that can prevent a vehicle driver from feeling discomfort is desired.

SUMMARY

The present disclosure provides an apparatus for performing driving aid control to cause a travel trajectory of a mobile object to follow a setpoint trajectory (La) by transmitting a control command value (δ) to a yaw moment controller capable of controlling a yaw moment of the mobile object. The apparatus includes: a setpoint trajectory setter configured to set the setpoint trajectory (La) of the mobile object; and a control command value calculator configured to calculate the control command value (δ) based on an integrated value (δI) of a lateral error that is an error between a position of the mobile object and the setpoint trajectory. The control command value calculator is further configured to decrease the integrated value (δI) with decreasing a curvature (ρ) of a road on which the mobile object is traveling.

In the above configuration, integral control based on the lateral error that is an error between a position of the mobile object and the setpoint trajectory is performed. Therefore, for example, the followability of the vehicle to the setpoint trajectory during traveling around a curve can be improved. In addition, the integrated value decreases with decreasing road curvature, which leads to a decrease in the control command value calculated based on the integrated value. Hence, the control command value can be inhibited from abruptly changing while suppressing phase delay of integral control, which can mitigate discomfort that the driver of the vehicle would feel.

DESCRIPTION OF SPECIFIC EMBODIMENTS

Figure 1:
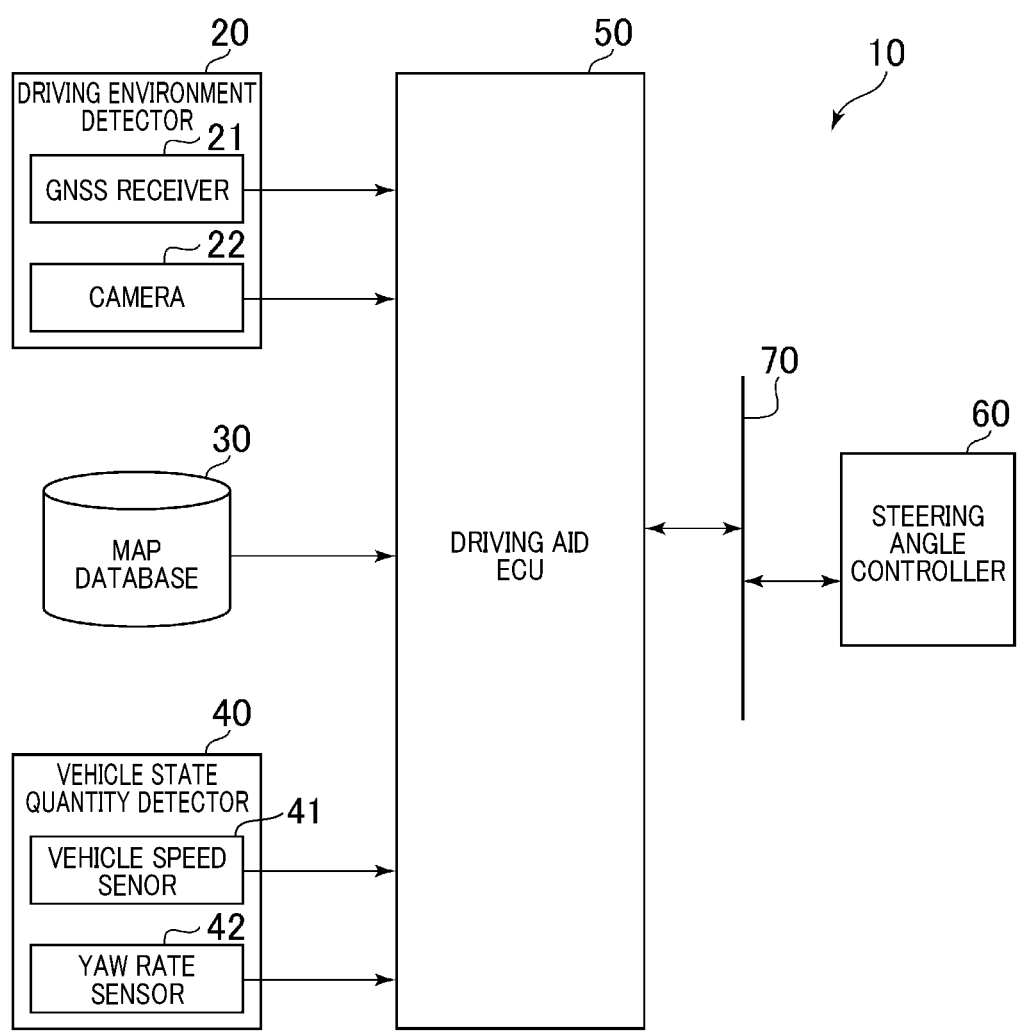
FIG. 1 illustrates a block diagram of a driving aid system according to a first embodiment of the present disclosure.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

A driving aid control apparatus according to a first embodiment will now be described with reference to the drawings. The driving aid control apparatus is used in a driving aid system that performs driving aid control to cause a travel trajectory of a vehicle to follow a setpoint trajectory.

As shown in FIG. 1, the driving aid system 10 for a vehicle according to the present embodiment includes a driving environment detector 20, a map database 30, a vehicle state quantity detector 40, a driving aid electronic control unit (ECU) 50, and a steering angle controller 60. In the present embodiment, the driving aid ECU 50 serves as a driving aid control apparatus.

The driving environment detector 20 detects a position of the vehicle, a road shape ahead of the vehicle, and others. The driving environment detector 20 includes a GNSS receiver 21 and a camera 22. The GNSS receiver 21 receives navigation signals from a plurality of satellites constituting a global navigation satellite system (GNSS), and outputs the received navigation signals to the driving aid ECU 50. The camera 22 outputs to the driving aid ECU 50 a signal corresponding to image data acquired by imaging ahead of the vehicle.

The map database 30 is a database of information, such as latitudes and longitudes of roads and various facilities. Information about road shapes and lanes of roads are also registered in the map database 30. The information about the lanes includes locations and types of the lane lines or lane boundaries. The map database 30 may be dedicated to the driving aid system 10 or may be a database commonly used in a car navigation device mounted in the vehicle.

The vehicle state quantity detector 40 detects various state quantities of the vehicle. The vehicle state quantity detector 40 includes a vehicle speed sensor 41 and a yaw rate sensor 42. The vehicle speed sensor 41 detects a travel speed of the vehicle based on a rotational speed of the wheel and outputs a signal corresponding to the detected travel speed to the driving aid ECU 50. The yaw rate sensor 42 detects a yaw rate that is a rate of change of a yaw angle over time and outputs a signal corresponding to the yaw rate to the driving aid ECU 50.

The driving aid ECU 50 is configured as a microcomputer or the like that incorporates therein a central processing unit (CPU) (not shown), a read-only memory (ROM) (not shown), a random access memory (RAM) (not shown). The CPU performs driving aid control processing to cause a travel trajectory of the vehicle to follow a setpoint trajectory. The ROM stores programs and data necessary for the driving aid control. The RAM transiently stores results of the CPU.

The driving aid ECU 50 loads output signals from the GNSS receiver 21 and the camera 22. The driving aid ECU 50 acquires information of a latitude φ and longitude λ corresponding to a current position of the vehicle based on the output signals from the GNSS receiver 21. The driving aid ECU 50 acquires image data I based on the output signal from the camera 22. The driving aid ECU 50 acquires map data M from the map database 30. The driving aid ECU 50 sets a setpoint trajectory La of the vehicle based on the acquired information from the GNSS receiver 21, the camera 22, and the map database 30.

The driving aid ECU 50 further loads output signals from the vehicle speed sensor 41 and the yaw rate sensor 42. The driving aid ECU 50 acquires information of a travel speed V and a yaw rate Y of the vehicle based on the output signals from the vehicle speed sensor 41 and the yaw rate sensor 42.

Based on the setpoint trajectory La, the travel speed V and the yaw rate Y, the driving aid ECU 50 calculates a steering angle command value δ for causing the actual travel trajectory of the vehicle to follow the setpoint trajectory La. The steering angle command value δ is a target steering angle.

The driving aid ECU 50 is communicatively connected to the steering angle controller 60 via an onboard network 70. The driving aid ECU 50 transmits via the onboard network 70 information of the steering angle command value δ to the steering angle controller 60, thereby performing the driving aid control to cause the travel trajectory of the vehicle to follow the setpoint trajectory.

The steering angle controller 60 is capable of controlling the steering angle of the vehicle. An electrically-powered steering device that applies an assistive torque to a steering shaft to thereby assist the driver of the vehicle in steering may be used as the steering angle controller 60. The steering angle controller 60 receives the steering angle command value δ from the driving aid ECU 50 via the onboard network 70, and performs steering angle feedback control to cause an actual steering angle to follow the steering angle command value δ. In the present embodiment, the steering angle controller 60 serves as a yaw moment controller capable of controlling a yaw moment of the vehicle.

The driving aid control to be performed in the driving aid ECU 50 will now be described in more detail.

Figure 2:
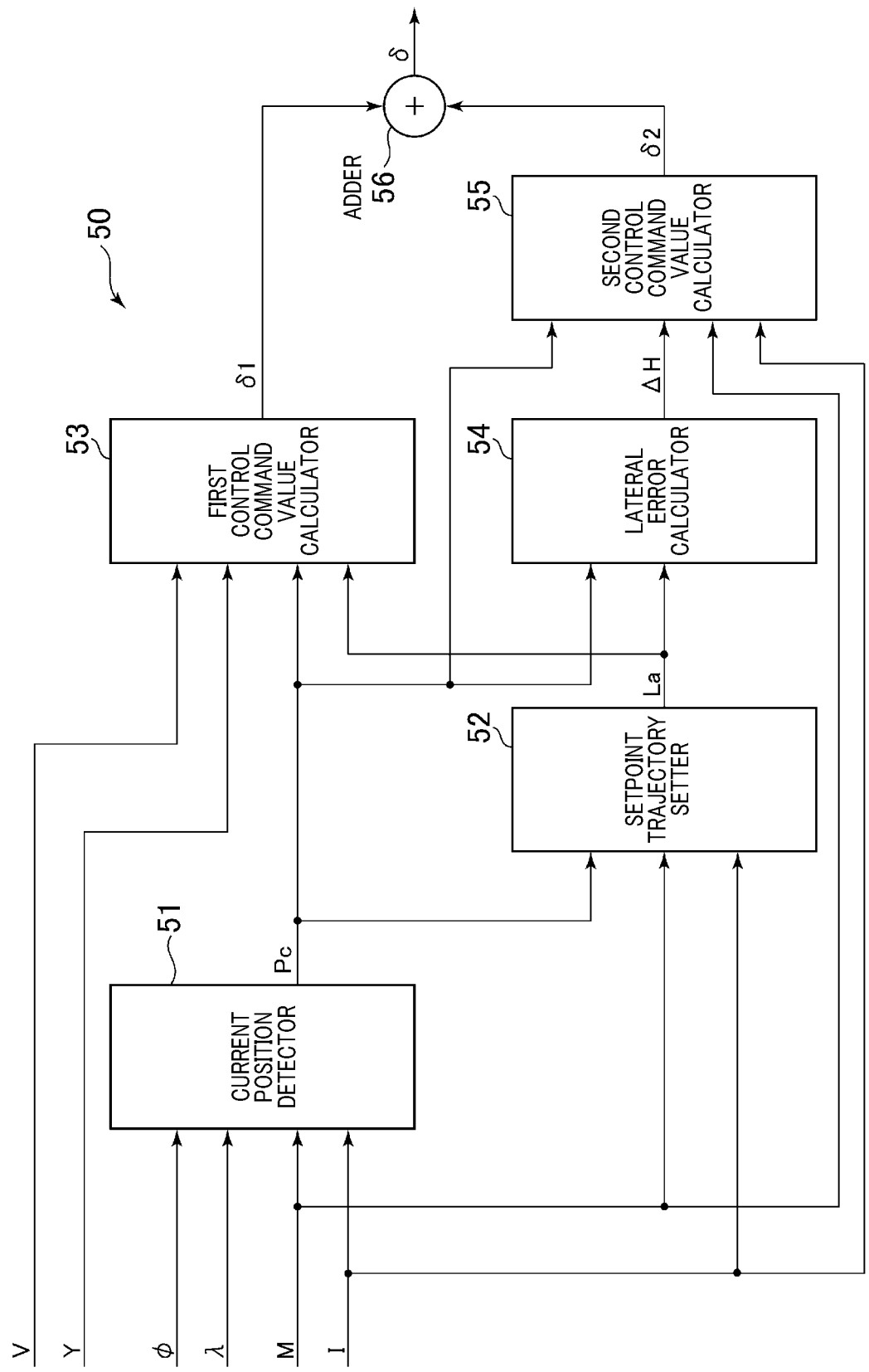
FIG. 2 illustrates a functional block diagram of a driving aid ECU of the first embodiment.

As shown in FIG. 2, the driving aid ECU 50 includes a current position detector 51, a setpoint trajectory setter 52, a first control command value calculator 53, a lateral error calculator 54, a second control command value calculator 55, and an adder 56.

The current position detector 51 receives information, such as a latitude φ and longitude λ corresponding to a current position of the vehicle, map data M, and image data I. The current position detector 51 detects a current position Pc of the vehicle based on the received information. More specifically, the latitude φ and longitude λ represent an absolute position on the map data M. The current position detector 51 translates the absolute position of the vehicle represented by the latitude φ and longitude λ on the map data M to a position in a vehicle's fixed coordinate system to acquire a relative positional relationship between each lane registered in the map data M and the vehicle. In addition, the current position detector 51 image-processes the image data in an appropriate manner to detect a position of a lane ahead of the vehicle, thereby acquiring a relative positional relationship between the lane and the vehicle. The current position detector 51 uses at least one of the relative positional relationship between the lane and the vehicle acquired from the map data M and the relative positional relationship between the lane and the vehicle acquired from the image data M to detect a current position Pc of the vehicle. Subsequent processing will be performed using the vehicle's fixed coordinate system.

The setpoint trajectory setter 52 receives information, such as the current position Pc of the vehicle detected by the current position detector 51, the map data M and the image data I. The setpoint trajectory setter 52 sets a setpoint trajectory based on the received information. For example, the setpoint trajectory setter 52 detects positions of lane lines that demarcate the lane that the vehicle is traveling in based on the map data M and the image data I, and sets a setpoint trajectory La to a center line between the two lane lines.

The first control command value calculator 53 receives information, such as the current position Pc of the vehicle detected by the current position detector 51, the setpoint trajectory La set by the setpoint trajectory setter 52, the travel speed V and yaw rate Y of the vehicle. Based on the received information, the first control command value calculator 53 calculates a first steering angle command value δ1 by performing target-position following control for causing the position of the vehicle to follow or approach a future target position Pc* on the setpoint trajectory La. In the present embodiment, the first steering angle command value δ1 corresponds to a first control command value, and the feedforward control corresponds to target-position following control. The following control method may be used as the target-position following control.

Figure 3:
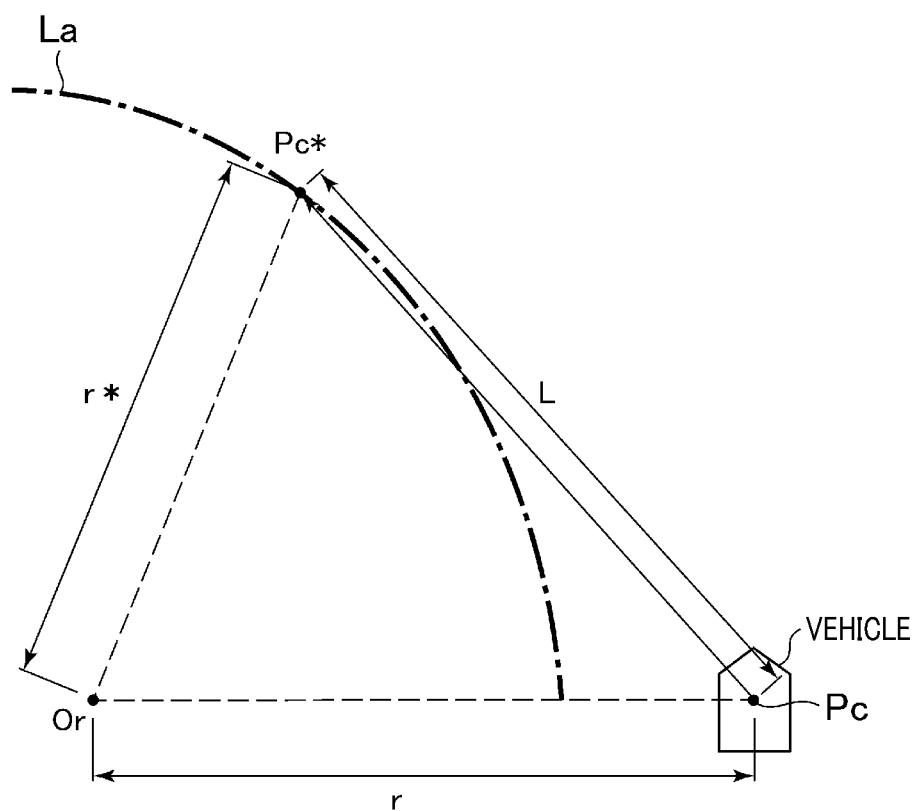
FIG. 3 illustrates target-position following control performed in the driving aid ECU of the first embodiment.

As shown in FIG. 3, it is assumed that, when the vehicle is located at a position Pc during traveling around a curve, a setpoint trajectory La is set to a dashed-dotted curved line. The first control command value calculator 53 sets a future target position Pc* to a position that is on and along the setpoint trajectory La and spaced apart from the current position Pc of the vehicle by a predetermined distance L. The predetermined distance L may be a distance that the vehicle can travel at a travel speed V for a predetermined time period.

The first control command value calculator 53 calculates a current position of the turning center Or and a current turning radius R based on the travel trajectory of the vehicle within the last predetermined time period and a current speed V and yaw rate Y of the vehicle. The travel trajectory of the vehicle within the last predetermined time period may be calculated based on time-sequence data of the instantaneous positions Pc of the vehicle within the last predetermined time period.

The first control command value calculator 53 calculates a turning radius when the vehicle is located at the target position Pc* as a target turning radius r*. For example, the first control command value calculator 53 calculates the target turning radius r* as a distance from the turning center Or to the target position Pc* assuming that the turning center when the vehicle is located at the target position Pc* coincides with the turning center Or when the vehicle is located at the current position Pc.

The first control command value calculator 53 performs the target-position following control that is feedback control based on an error between the calculated current turning radius r and the target turning radius r* to thereby calculate a first steering angle command value δ1. In the target-position following control, the first steering angle command value δ1 may be calculated by multiplying the error between the calculated current turning radius r and target turning radius r* by a predetermined control gain. Such feedback control allows the position of the vehicle to follow the future target position Pc* set on the setpoint trajectory La.

Figure 4:
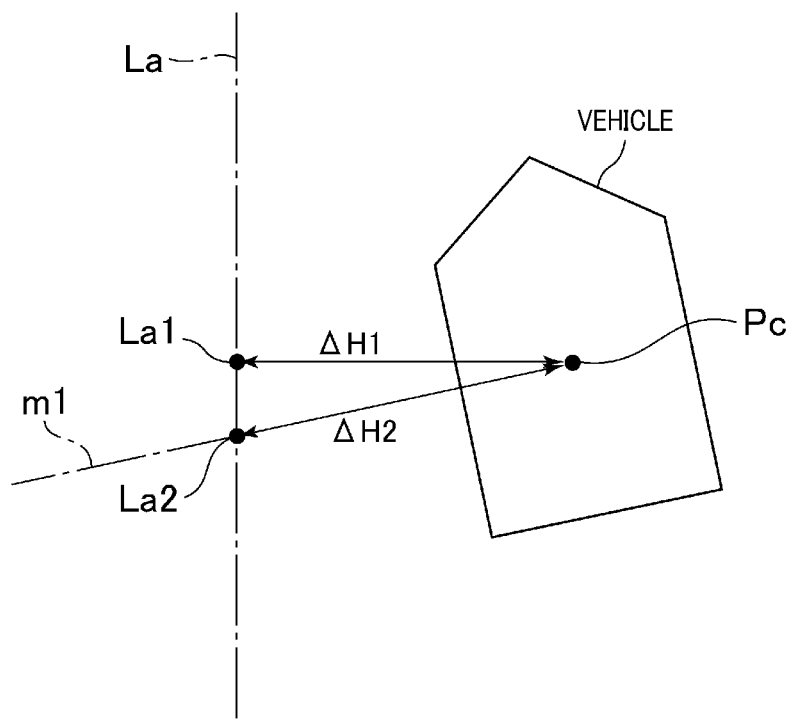
FIG. 4 illustrates an example of a lateral error used in setpoint-trajectory following control performed in the driving aid ECU of the first embodiment.

As shown in FIG. 2, the lateral error calculator 54 receives information, such as the current position Pc of the vehicle detected by the current position detector 51 and the setpoint trajectory La set by the setpoint trajectory setter 52. Based on the received information, the lateral error calculator 54 calculates a lateral error ΔH that is an error between the current position Pc of the vehicle and the setpoint trajectory La. For example, as shown in FIG. 4, the lateral error calculator 54 may use a distance ΔH1 between the current position Pc and a position La1 on the setpoint trajectory La as a lateral error ΔH, where the position La1 is closest to the current position Pc. Alternatively, the lateral error calculator 54 may use a distance ΔH2 between the current position Pc of the vehicle and a position La2 as a lateral error ΔH, where the position La2 is an intersection of the setpoint trajectory La and an axis m1 laterally extending from the current position Pc of the vehicle.

As shown in FIG. 2, the second control command value calculator 55 receives information such as the lateral error ΔH calculated by the lateral error calculator 54, the current position Pc detected by the current position detector 51, the map data M, and the image data I. The second control command value calculator 55 calculates a second steering angle command value δ2 based on the received information by performing setpoint-trajectory following control to cause the current position Pc of the vehicle to follow or approach the setpoint trajectory La.

Figure 5:
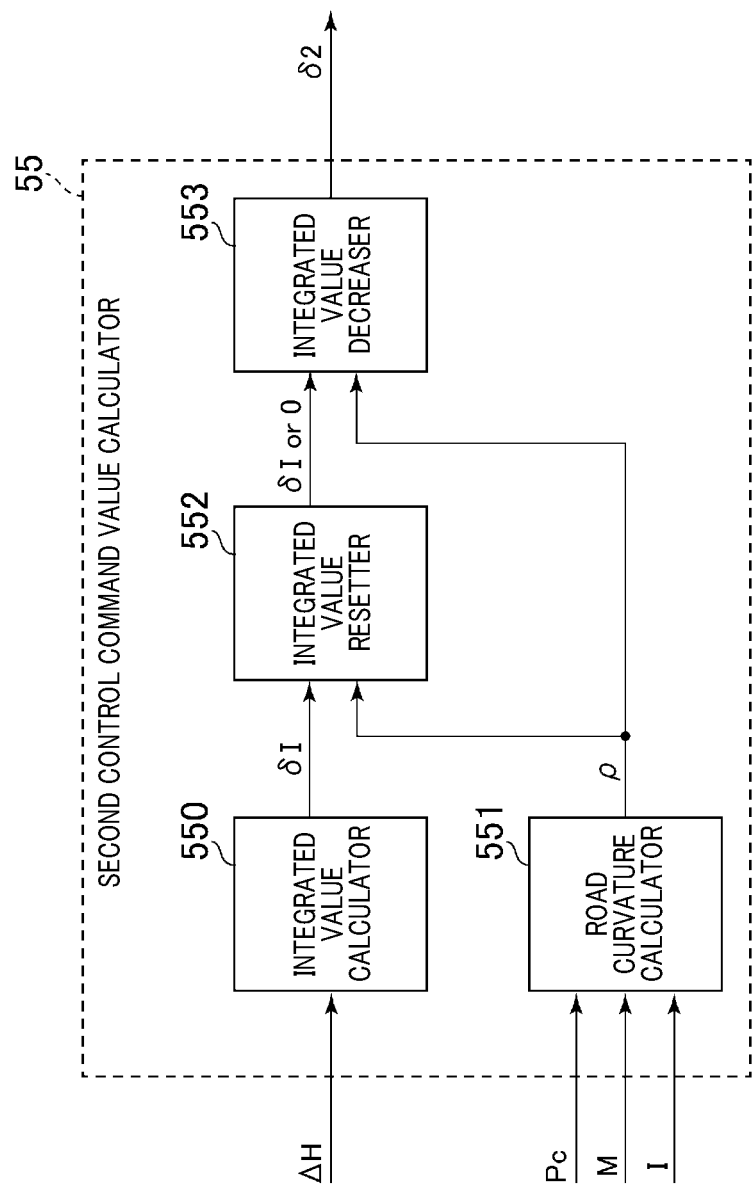
FIG. 5 illustrates a functional block diagram of a second control command value calculator of the first embodiment.

More specifically, as shown in FIG. 5, the second control command value calculator 55 includes an integrated value calculator 550, a road curvature calculator 551, an integrated value resetter 552, and an integrated value decreaser 553.

The integrated value calculator 550 calculates an integrated value δI of the lateral error ΔH.

The road curvature calculator 551 calculates a curvature ρ of a road on which the vehicle is traveling. More specifically, the road curvature calculator 551 receives information, such as the current position Pc of the vehicle, the map data M, and the image data I. Based on the received information, the road curvature calculator 551 detects a shape of lane lines (or lane boundaries) that demarcate a lane in which the vehicle is traveling, and based on the detected lane line shape, calculates a curvature ρ of the road that the vehicle is traveling on.

The integrated value resetter 552 receives the integrated value δI calculated by the integrated value calculator 550 and the road curvature ρ calculated by the road curvature calculator 551. If the road curvature ρ is equal to or less than a reset curvature (also referred to as a first curvature) ρr, the integrated value resetter 552 resets the integrated value δI to zero. If the road curvature ρ is greater than the reset curvature ρr, the integrated value resetter 552 directly outputs the integrated value δI.

The integrated value decreaser 553 receives the integrated value δI output from the integrated value resetter 552 and the road curvature ρ calculated by the road curvature calculator 551. The integrated value decreaser 553 calculates a second steering angle command value δ2 based on the integrated value δI and the road curvature ρ.

More specifically, the integrated value decreaser 553 calculates a decremental gain Kdgn according to the following equation (f1):

$$Kdgn = \min\left(1, \frac{\rho}{\rho s}\right) \quad (f1)$$

In the equation (f1), ρs is a start-of-decrease curvature (also referred to as a second curvature) such that when the start-of-decrease curvature ρs is reached, the integrated value δI starts to decrease. The start-of-decrease curvature ρs may be determined by experience and prestored in the ROM of the driving aid ECU 50.

According to the equation (f1), the integrated value decreaser 553 sets the decremental gain Kdgn to a smaller one of one and (ρ/ρs). If ρ/ρs is less than one, the decremental gain Kdgn is set to ρ/ρs. If ρ/ρs is equal to or greater than one, the decremental gain Kdgn is set to one.

After calculating the decremental gain Kdgn, the integrated value decreaser 553 calculates a final integrated value δI according to the following equation (f2):

$$\delta I \leftarrow Kdgn \times \delta I \tag{f2}$$

The second control command value calculator 55 outputs the final integrated value δI calculated by the integrated value decreaser 553 as a second steering angle command value δ2. The second control command value calculator 55 may calculate the second steering angle command value δ2 by multiplying the integrated value δI by an integral gain. The integral gain may be changed depending on road environmental quantities, such as a road curvature ρ, and vehicle state quantities, such as a travel speed V.

Processing to calculate the second steering angle command value δ2 to be performed in the second control command value calculator 55 will now be described with reference to FIG. 6.

Figure 6:
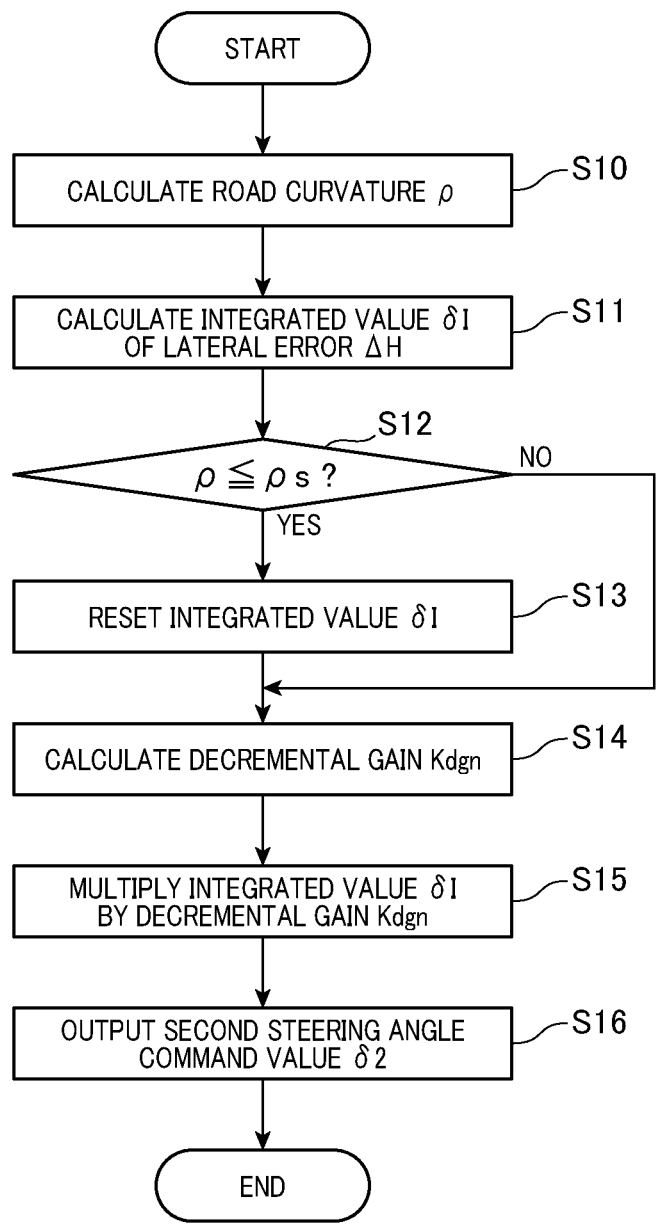
FIG. 6 illustrates a flowchart of processing performed in the driving aid ECU of the first embodiment.

As shown in FIG. 6, in step S10, the second control command value calculator 55 calculates a road curvature ρ based on information, such as the current position Pc of the vehicle, the map data M, and the image data I. In step S11, the second control command value calculator 55 calculates an integrated value δI of the lateral error ΔH. In step S12, the second control command value calculator 55 determines whether or not the road curvature ρ is equal to or less than a start-of-decrease curvature ρs.

If in step S12 it is determined that the road curvature ρ is equal to or less than the start-of-decrease curvature ρs, then in step S13 the second control command value calculator 55 resets the integrated value δI to zero.

If in step S12 it is determined that the road curvature ρ is greater than the start-of-decrease curvature ρs, then in step S14 the second control command value calculator 55 calculates a decremental gain Kdgn depending on the road curvature ρ. In step S15, the second control command value calculator 55 calculates a final integrated value δI by multiplying the integrated value δI by the decremental gain Kdgn. In step S16, the second control command value calculator 55 outputs the integrated value δI as a second steering angle command value Ω.

In the second control command value calculator 55, the road curvature calculator 551 executes the operation of step S10. The integrated value calculator 550 executes the operation of step S11. The integrated value resetter 552 executes the operations of steps S12, S13. The integrated value decreaser 553 executes the operations of steps S14-S16.

As shown in FIG. 2, the second steering angle command value δ2 calculated by the integrated value decreaser 553 is outputted to the adder 56. The adder 56 adds the first steering angle command value δ1 calculated by the first control command value calculator 53 and the second steering angle command value δ2 calculated by the second control command value calculator 55 to calculate a final steering angle command value δ. The driving aid ECU 50 transmits the steering angle command value δ calculated by the adder 56 to the steering angle control apparatus 60. In the present embodiment, the adder 56 serves as a third control command value calculator.

Operations of the driving aid system 10 of the present embodiment will now be described with reference to FIGS. 7-10.

Figure 7:
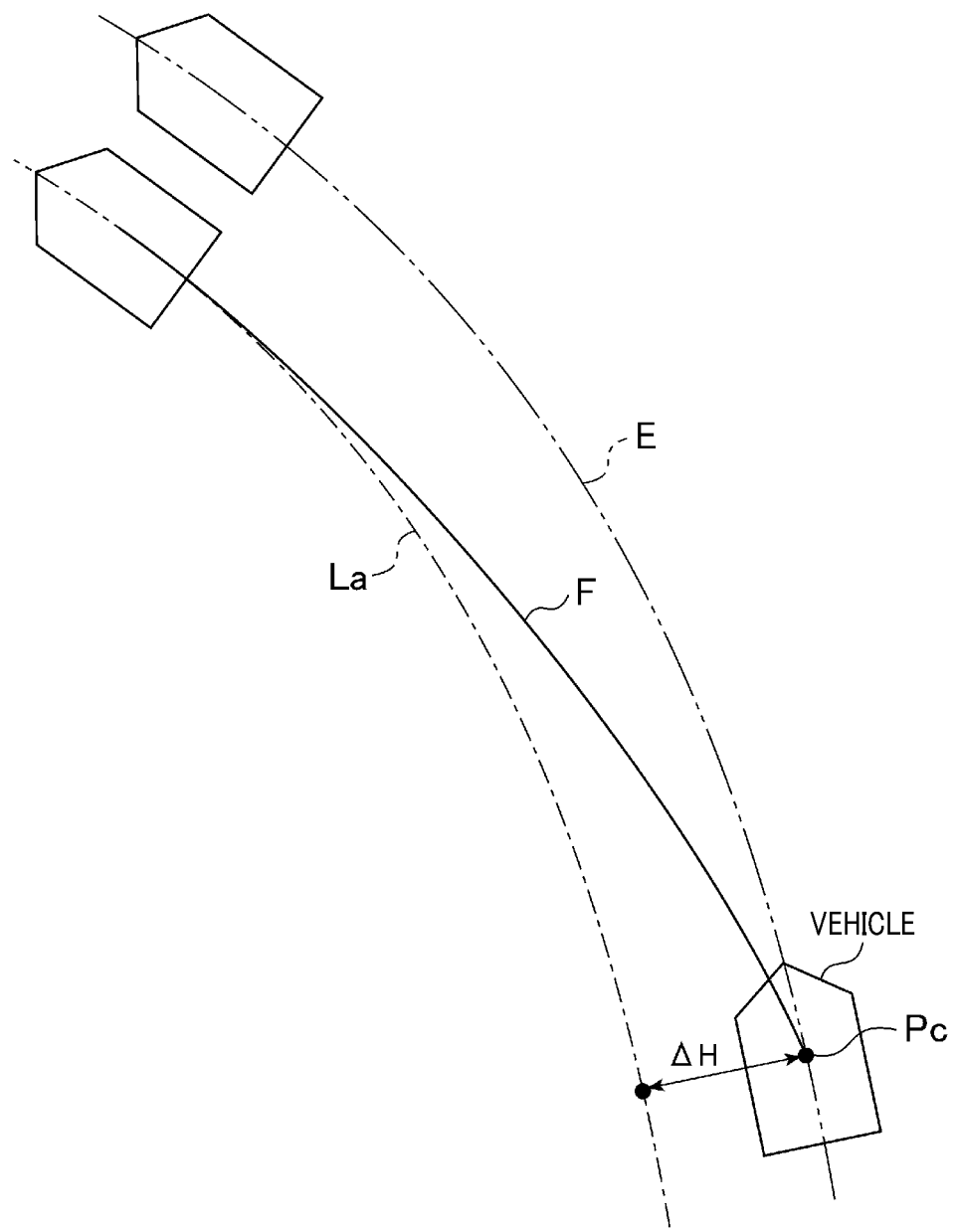
FIG. 7 illustrates an example of vehicle behavior under driving aid control of the first embodiment.

Under an assumption that, when the vehicle is traveling around a curve, that is, when the vehicle is turning, a setpoint trajectory La is set to a dashed-dotted line as shown in FIG. 7, the driving aid control based on the first steering angle command value δ1 alone, that is, the target-position following control alone, may lead to an actual trajectory E of the vehicle as indicated by a dashed-two dotted line due to the presence of various disturbance factors. That is, a steady state error occurring in the target-position following control may prevent the actual travel trajectory E of the vehicle from following the setpoint trajectory La.

In the present embodiment, the driving aid system 10 further performs the setpoint-trajectory following control to calculate the second steering angle command value δ2 based on the lateral error ΔH. The driving aid control based on the second steering angle command value δ2, that is, the setpoint-trajectory following control, can remove the steady state error of the target-position following control. As indicated by a solid line F in FIG. 7, such a configuration allows the travel trajectory of the vehicle to follow or approach the setpoint trajectory La.

Figure 8:
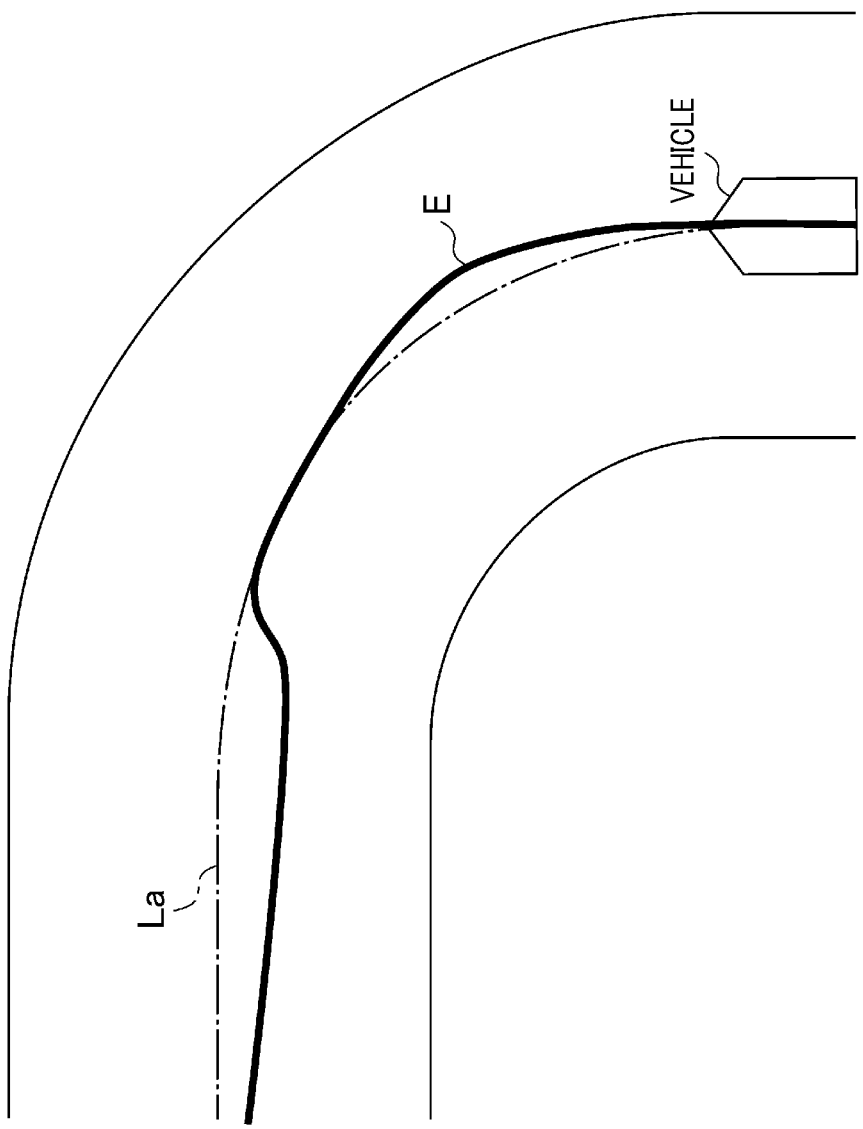
FIG. 8 illustrates a vehicle behavior under driving aid control in a comparative example.

Since the setpoint-trajectory following control is integral control, phase delay of the integral control may deteriorate the followability to the setpoint trajectory La when the vehicle enters a straight road from a curve. More specifically, as shown in FIG. 8, when the vehicle enters a straight road from a curve, a travel trajectory E of the vehicle may deviate from the setpoint trajectory La. Such a deficiency can be removed by resetting the integrated value δI to zero when the vehicle enters a straight road from a curve. However, resetting the integrated value δI may cause an abrupt change in the second steering angle command value δ2, which may cause the driver of the vehicle to feel discomfort.

Figure 9:
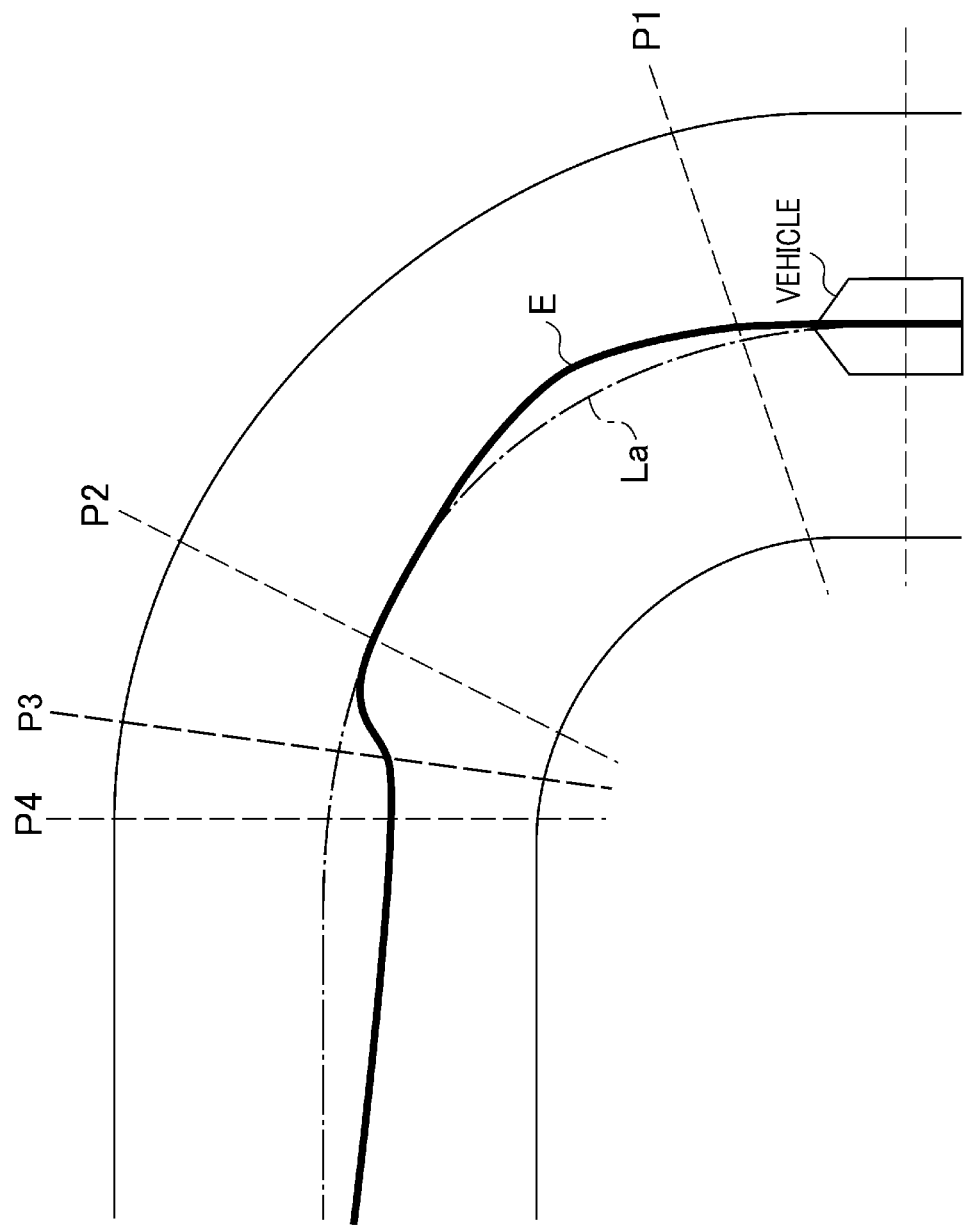
FIG. 9 illustrates an example of vehicle behavior under driving aid control of the first embodiment.
Figure 10A:
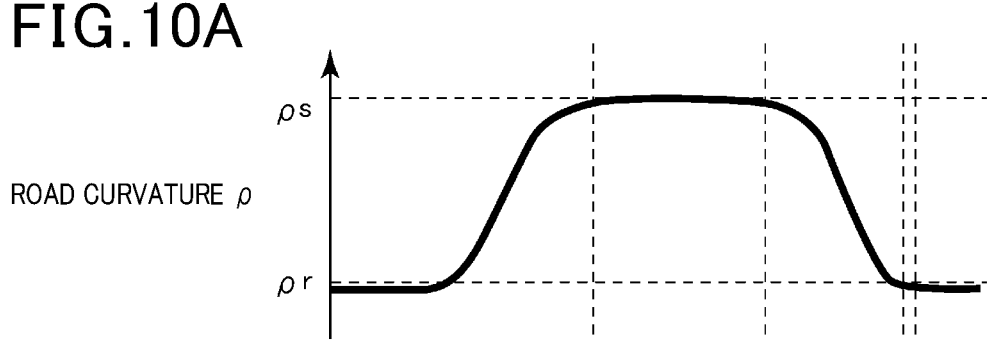
FIGS. 10A, 10B, 10C, and 10D are a timing diagram illustrating time courses of a road curvature ρ, a decremental gain Kdgn, a second steering angle command value δ2, and a steering angle command value δ.

In the present embodiment, the driving aid ECU 50 gradually decreases the integrated value δI while the vehicle is traveling from a point in the middle of a curve to the exit of the curve, which can inhibit a large variation in the second steering angle command value δ2. For example, when the vehicle is traveling around a curve as shown in FIG. 9, a road curvature ρ may change depending on a position on the curve as showing in FIG. 10A. That is, the road curvature ρ increases as the vehicle approaches a position P1. While the vehicle is traveling in a section from the position P1 to a position P2, the road curvature ρ takes a constant value. During travel from the position P2 to a position P4, the road curvature ρ decreases as the vehicle approaches the position P4. Upon reaching the position P4, the road curvature ρ becomes almost zero. In the example of FIG. 9 and FIG. 10A, the road curvature ρ in a section from the position P1 to the position P2 is a start-of-decrease curvature ρs.

Figure 10B:
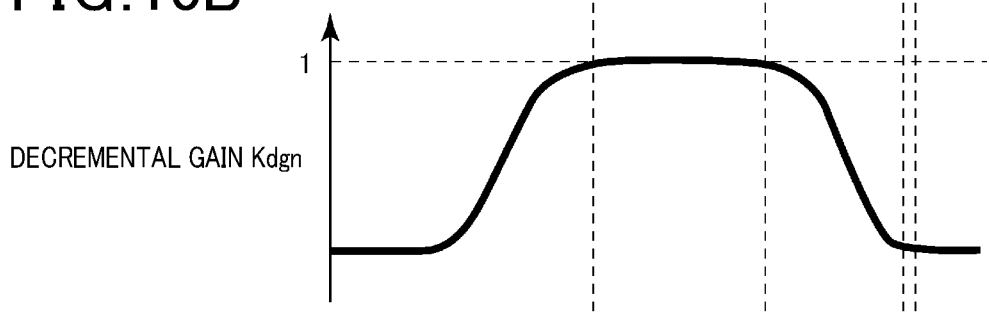

FIG. 10B shows a decremental gain Kdgn calculated by the driving aid ECU 50 according to the equation (f1) in such a situation. As shown in FIG. 10B, the decremental gain Kdgn increases as the vehicle approaches the position P1. While the vehicle is traveling in a section from the position P1 to the position P2, the decremental gain Kdgn is set to one. The decremental gain Kdgn decreases as the vehicle approaches the position P4 from the position P2. Upon reaching the position P4, the decremental gain Kdgn becomes almost zero.

Figure 10C:
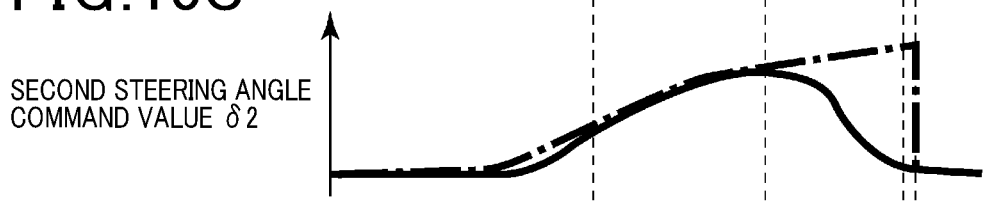
Figure 10D:
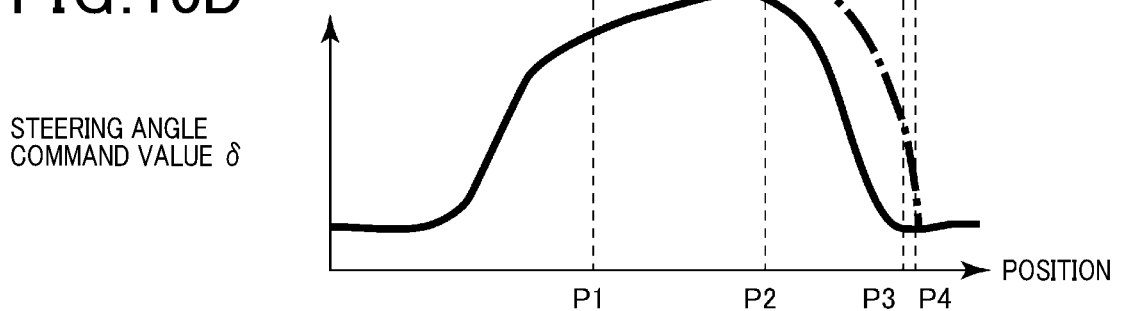

In such a case, while the vehicle is traveling in a section from the position P2 to the position P4, the integrated value δI decreases with decreasing decremental gain Kdgn. Thus, as shown in FIG. 10C, while the vehicle is traveling in the section from the position P2 to the position P4, the second steering angle command value δ2 also decreases accordingly. At a position P3 where the road curvature ρ decreases to or below a reset curvature ρr, the integrated value δI is set to zero. At the same time, the second steering angle command value δ2 is also reset accordingly. As can be seen from FIG. 10C, comparing a time course of the second steering angle command value δ2 of the present embodiment indicated by a solid line with a time course of the second steering angle command value δ2 in a comparative example indicated by a dashed-dotted line where the integrated value δI is not decreased, the driving aid ECU 50 of the present embodiment can inhibit the second steering angle command value δ2 from abruptly changing. Therefore, as can be seen from FIG. 10D, comparing a time course of the steering angle command value δ of the present embodiment indicated by a solid line with a time course of the steering angle command value δ in the comparative example indicated by a dashed-dotted line where the integrated value δI is not gradually decreased, the driving aid ECU 50 of the present embodiment can inhibit the steering angle command value δ from abruptly changing.

The driving aid ECU 50 of the present embodiment described as above can provide the following advantages (1) to (4).

(1) The second control command value calculator 55 calculates a second steering angle command value δ2 based on an integrated value δI of a lateral error ΔH that is an error between a position of the vehicle and a setpoint trajectory La. The second control command value calculator 55 decreases the integrated value δI with decreasing road curvature ρ of a road on which the vehicle is traveling. Performing integral control based on the lateral error ΔH can improve the followability of the vehicle to the setpoint trajectory La, for example, while the vehicle is traveling around a curve. In addition, the integrated value δI decreases with decreasing road curvature ρ, which allows the second steering angle command value δ2 calculated based on the integrated value δI to decrease. With this configuration, the steering angle command value δ can be inhibited from abruptly changing while suppressing phase delay of integral control, which can mitigate discomfort that the driver of the vehicle would feel.

(2) The second control command value calculator 55 resets the integrated value δI when the road curvature ρ decreases to or below the reset curvature ρr. With this configuration, the phase delay of the integral control can be reliably suppressed, which can improve the followability of the vehicle to a straight road.

(3) The second control command value calculator 55 calculates the decremental gain Kdgn with decreasing road curvature ρ, and decreases the integrated value δI by multiplying the integrated value δI by the decremental gain Kdgn. With this configuration, the integrated value δI can be readily decreased with decreasing road curvature ρ.

(4) The second control command value calculator 55 calculates the decremental gain Kdgn based on the equation (f1), that is, based on a ratio of the road curvature ρ to the predefined start-of-decrease curvature ρs. With this configuration, adjusting the start-of-decrease curvature ρs can arbitrarily adjust the effect of the integral control depending upon the magnitude of the road curvature ρ. This can also eliminate a need to determine from when to when to decrease the integrated value δI. In addition, as the start-of-decrease curvature ρs is set to a larger value, the decremental gain Kdgn for the road curvature ρ becomes relatively small, which can make the integral control less efficient during travel in a road segment having a smaller road curvature ρ. That is, as the shape of a road that the vehicle is traveling on approaches a straight line, the lateral error ΔH is less likely to increase. Therefore, reducing the effect of the integral control would have little practical effect.

First Modification

A driving aid ECU 50 according to a first modification to the first embodiment will now be described.

When the vehicle is traveling around a curve, a lateral error ΔH that is an error between a position of the vehicle and a setpoint trajectory La is likely to increase with increasing travel speed V. Accordingly, the followability to the setpoint trajectory La is likely to deteriorate.

Figure 11:
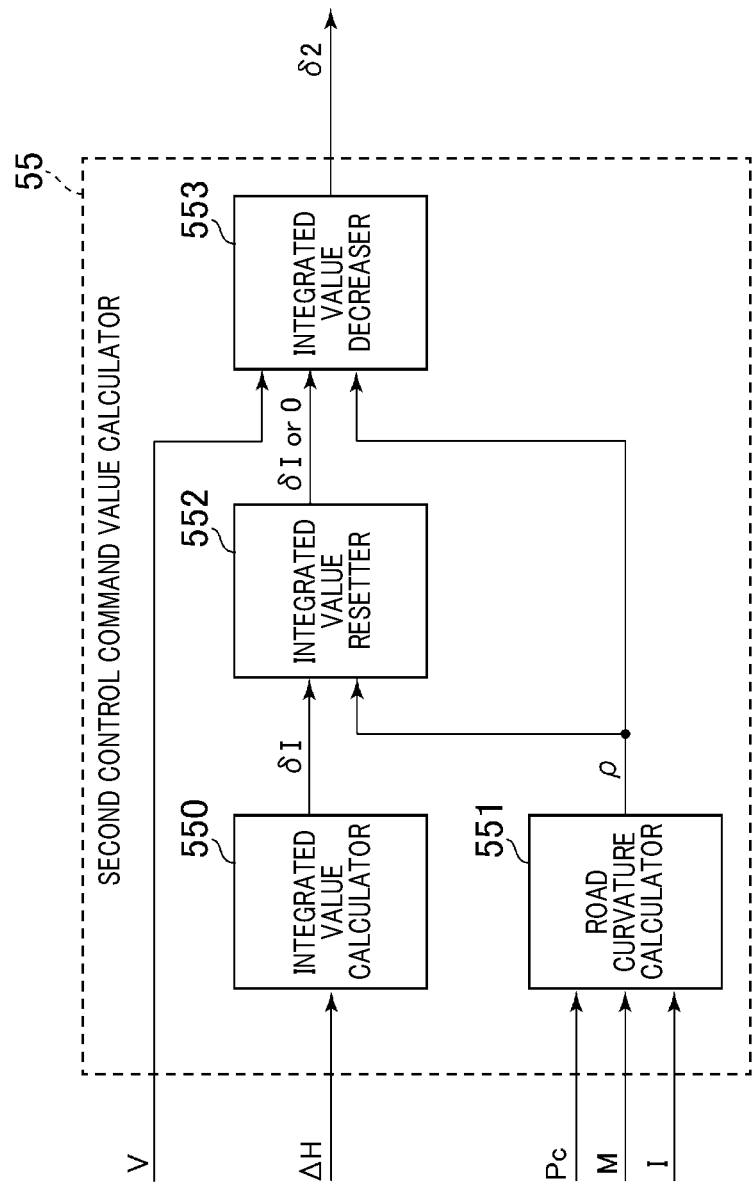
FIG. 11 illustrates a functional block diagram of a second control command value calculator according to a first modification to the first embodiment.

The driving aid ECU 50 of the present modification sets a start-of-decrease curvature ρs based on the travel speed V. More specifically, as shown in FIG. 11, the integrated value decreaser 553 of the present modification receives information of the travel speed V. The integrated value decreaser 553 sets the start-of-decrease curvature ρs to a value that decreases with increasing travel speed V. With this configuration, when the vehicle is traveling at a speed within a high speed range where the lateral error ΔH is likely to increase, the decremental gain Kdgn reaches one when the vehicle is traveling around a curve having smaller curvature ρ. That is, the integral control becomes more efficient to achieve the followability to the setpoint trajectory.

Second Modification

A driving aid ECU 50 according to a second modification to the first embodiment will now be described.

Figure 12:
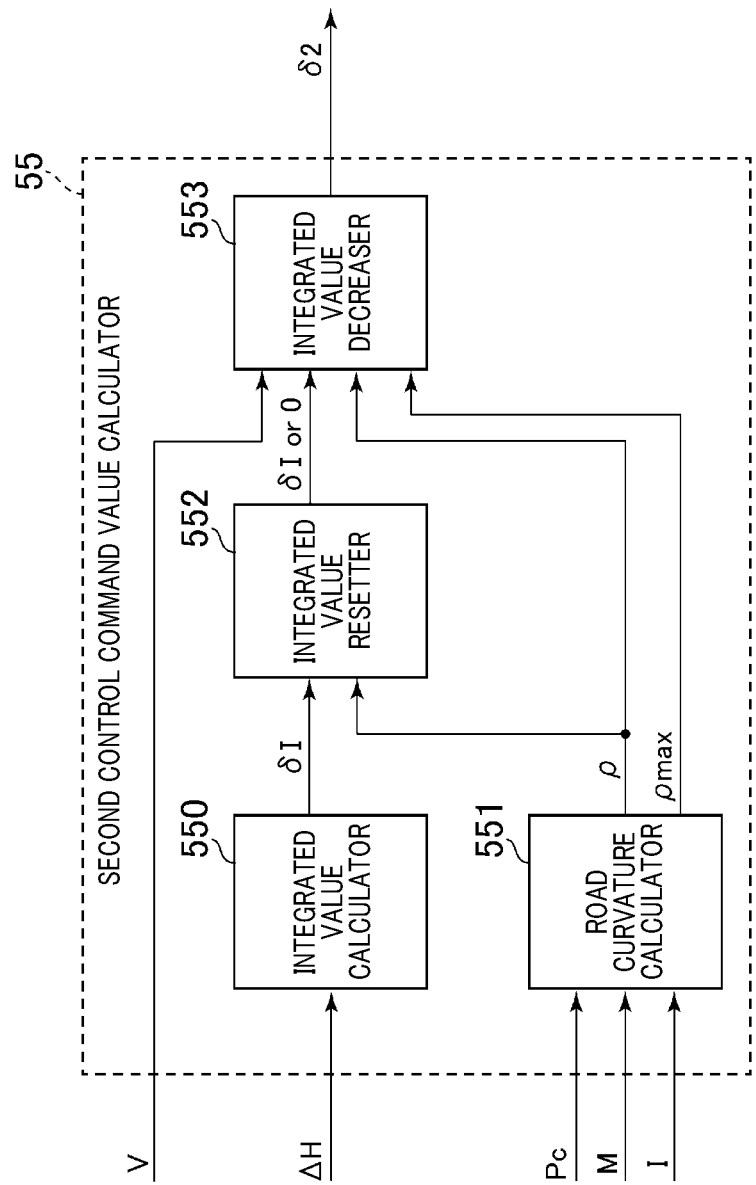
FIG. 12 illustrates a functional block diagram of a second control command value calculator according to a second modification to the first embodiment.

As shown in FIG. 12, the road curvature calculator 551 of the present modification calculates a maximum curvature ρmax of a road on which the vehicle is traveling. More specifically, when the road curvature ρ starts to increase upon the vehicle entering a curve from a straight road, the road curvature calculator 551 compares a current and a previous value of the road curvature ρ that are respectively a value of the road curvature ρ calculated in the current cycle and a value of the road curvature ρ calculated in the previous cycle, and if the current value of the road curvature ρ is greater than the previous value of the road curvature ρ, stores the current value of the road curvature ρ as a maximum curvature ρmax. That is, the road curvature calculator 551 calculates the maximum curvature ρmax based on the following equation (f3):

$$\rho max = \max(\rho) \quad (f3)$$

The road curvature calculator 551 sets the maximum curvature ρmax to zero when the road curvature ρ decreases to or below a threshold ρth. The threshold ρth may be predetermined by experience to determine whether or not the road curvature ρ has decreased to zero, and stored in the ROM of the driving aid ECU 50.

The integrated value decreaser 553 further receives the maximum curvature ρmax calculated by the road curvature calculator 551. The integrated value decreaser 553 calculates the decremental gain Kdgn according to the following equation (f4):

$$Kdgn = \min\left(1, \frac{\rho}{\rho max}\right) \quad (f4)$$

Operations of the driving aid ECU 50 of the present modification will now be described.

Figure 13A:
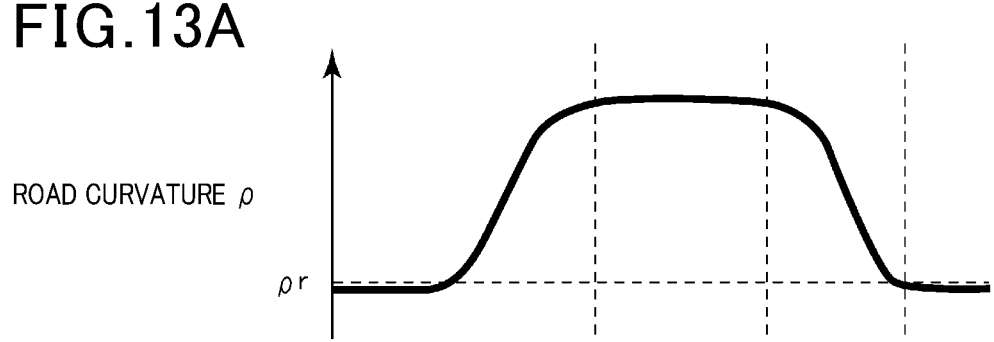
FIGS. 13A, 13B, and 13 C are a timing diagram illustrating time courses of a road curvature ρ, a maximum curvature ρmax, and a decremental gain Kdgn.
Figure 13B:
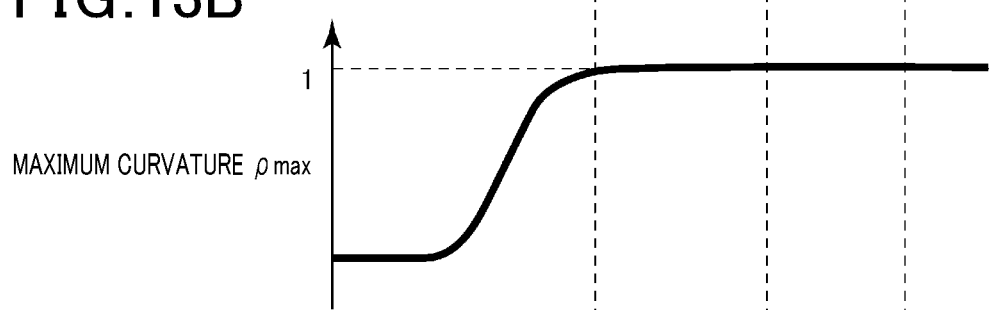

For example, when the vehicle is traveling around a curve as shown in FIG. 9, the road curvature ρ may change depending on a position of the vehicle as shown in FIG. 13A. That is, the maximum curvature ρmax increases as the vehicle approaches the position P1. While the vehicle is traveling in a section from the position P1 to the position P2, the maximum curvature ρmax takes a constant value. At the position P3 where the road curvature ρ decreases to or below the threshold ρth, the maximum curvature ρmax is reset to zero.

Figure 13C:
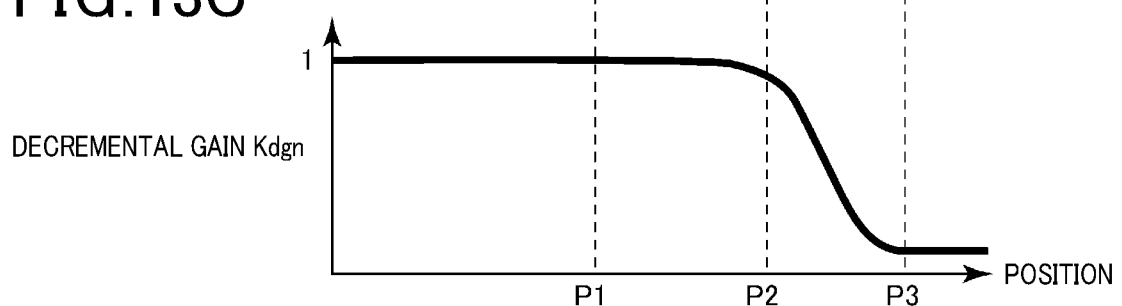

FIG. 13C shows a time course of the decremental gain Kdgn calculated by the driving aid ECU 50 according to the equation (f4) in such a situation. As shown in FIG. 13C, the decremental gain Kdgn is set to one until the vehicle reaches the position P2. After the vehicle has reached the position P2, the decremental gain Kdgn decreases with decreasing road curvature ρ.

As above, the driving aid ECU 50 of the present modification calculates the decremental gain Kdgn based on the equation (f4), that is, based on a ratio of the road curvature ρ to the maximum curvature ρmax. Even when using such a method to calculate the decremental gain Kdgn, it is possible to calculate the decremental gain Kdgn that decreases with decreasing road curvature ρ. In addition, regardless of the magnitude of the road curvature ρ, the decremental gain Kdgn is reliably set to one as long as the road curvature ρ is the maximum curvature ρmax, which can more reliably achieve the effect of the integral control.

Second Embodiment

A second embodiment of the present disclosure will now be described. Only differences of the second embodiment from the first embodiment will be described.

In the driving aid ECU 50 of the present embodiment, the first control command value calculator 53 calculates a first steering angle command value δ1 by performing feedforward control based on a future target position Pc* on the setpoint trajectory La and a travel speed V.

More specifically, the first control command value calculator 53 calculates a travel trajectory that allows the vehicle to approach the target position Pc* from the current position Pc and calculates a target curvature ρa of the calculated travel trajectory. Subsequently, the first control command value calculator 53 calculates a first steering angle command value δ1 to achieve or attain the target curvature ρa according to equations based on a two-wheel model of a vehicle. More specifically, the first control command value calculator 53 calculates a first steering angle command value δ1 according to the following equations (f5)-(f7):

$$\delta 1 = V \times \rho a \times \frac{a11}{b11} \quad (f5)$$

$$a11 = -2\frac{(Lf^2 \times Kf + Lr^2 \times Kr)}{J \times V} \quad (f6)$$

$$b11 = 2\frac{Lf \times Kf}{J} \quad (f7)$$

In the equations (f5)-(f7), J is a yaw moment of inertia of the vehicle, Kf is front-wheel cornering power, Kr is rear-wheel cornering power, Lf is a distance between a vehicle center of gravity and a front-wheel axis, and Lr is distance between a vehicle center of gravity and a rear-wheel axis. These parameters are pre-stored in the ROM of the driving aid ECU 50.

Figure 14:
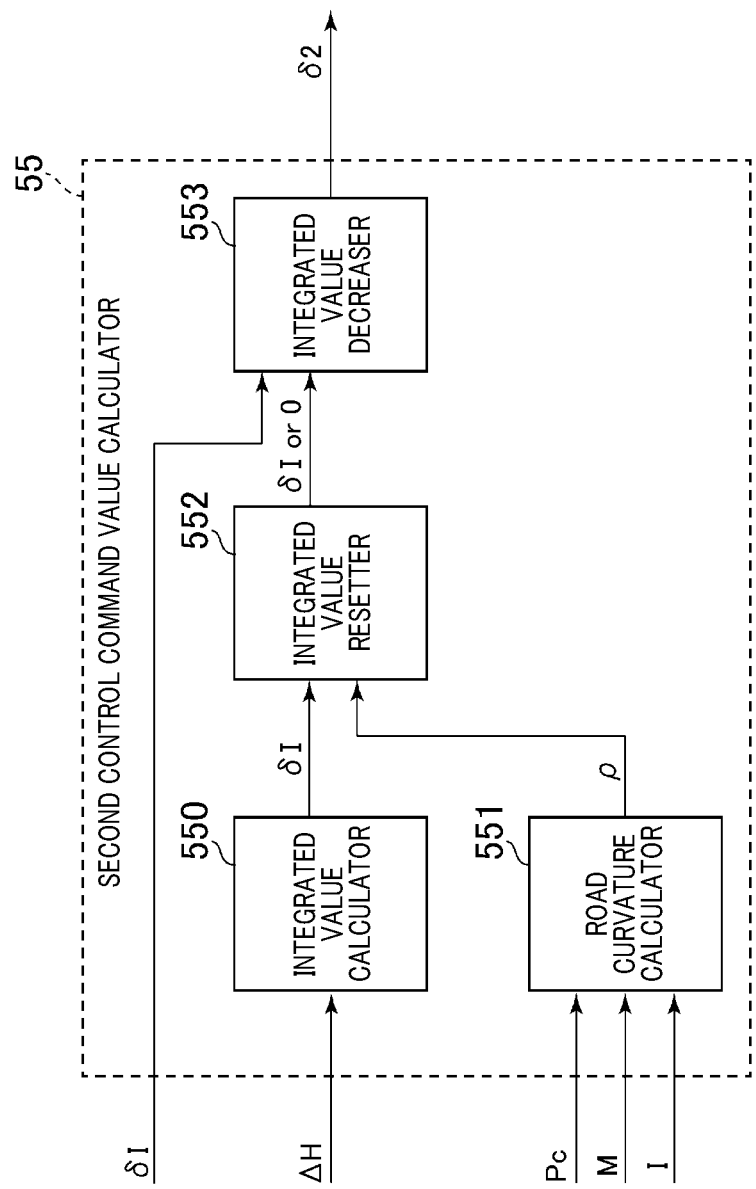
FIG. 14 illustrates a functional block diagram of a second control command value calculator according to a second embodiment.

As shown in FIG. 14, the second control command value calculator 55 receives the first steering angle command value δ1 calculated by the first control command value calculator 53. The second control command value calculator 55 calculates a decremental gain Kdgn according to the following equation (f8) using the first steering angle command value δ1:

$$Kdgn = \min\left(1, \frac{\delta 1}{\delta th}\right) \quad (f8)$$

In the equation (f8), δth is a start-of-decrease steering angle such that when the first steering angle command value δ1 decreases to or below the start-of-decrease steering angle δth, the integrated value δI starts to decrease. The start-of-decrease steering angle δth may be predetermined by experience, and stored in the ROM of the driving aid ECU 50.

The second control command value calculator 55 of the present embodiment calculates the decremental gain Kdgn based on the equation (f8), that is, based on a ratio of the first steering angle command value δ1 to the predetermined start-of-decrease steering angle δth, where the first steering angle command value δ1 is a control command value for the feedforward control. With this configuration, the present embodiment can provide a similar advantage to the advantage (4) of the first embodiment.

Third Embodiment

A third embodiment of the present disclosure will now be described. Only differences of the second embodiment from the first embodiment will be described.

Figure 15:
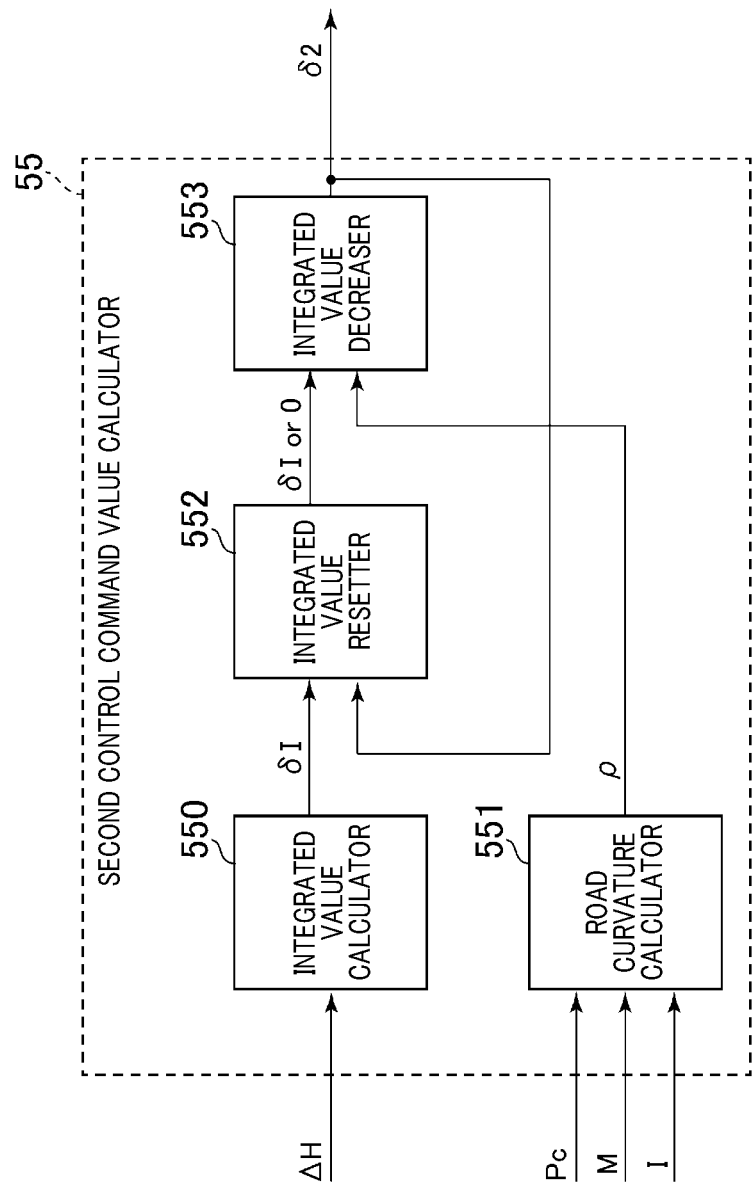
FIG. 15 illustrates a functional block diagram of a second control command value calculator according to a third embodiment.

As shown in FIG. 15, the integrated value resetter 552 of the present embodiment receives the integrated value δI calculated by the integrated value decreaser 553. The integrated value resetter 552 resets the integrated value δI calculated by the integrated value decreaser 553 to zero when the integrated value δI decreases to or below the reset threshold δr. With this configuration, the present embodiment can provide a similar advantage to the advantage (2) of the first embodiment.

Modifications

There will now be described some modifications that may be devised without departing from the spirit and scope of the present disclosure.

(M1) The second control command value calculator 55 of the first embodiment may perform calculation of the second steering angle command value δ2 based on the integrated value δI, only when the vehicle is turning, which may remove the effect of the integral control upon entering a curve from a straight road. The second control command value calculator 55 may include an integral controller that operates when the vehicle is driving straight and an integral controller that operates when the vehicle is traveling around a curve. In such a modification, the second control command value calculator 55 may perform integral control by switching seamlessly between these integral controllers in response to the road curvature ρ. The second control command value calculator 55 may always operate the integral controller for straight driving, which allows the vehicle to turn around a curve while removing offsets of sensors.

(M2) The driving aid ECU 50 of the first embodiment may change the start-of-decrease curvature ρs based on various vehicle state quantities, such as a travel speed V, a yaw rate Y, a lateral and a longitudinal acceleration of the vehicle, and a lateral error ΔH. Similarly, the driving aid ECU 50 of the second embodiment may change the start-of-decrease steering angle δth based on various vehicle state quantities.

(M3) The method of the feedforward control performed by the first control command value calculator 53 of the second embodiment may be changed as appropriate. For example, the first control command value calculator 53 may calculate the first steering angle command value δ1 using a look-ahead model, a primary predictive model, a secondary predictive model or the like. The look-ahead model is a control method based on a lateral error between the setpoint trajectory La and a point of regard that is located at a predetermined distance from the current position Pc in the travel direction of the vehicle. The primary predictive model and the secondary predictive model are control methods based on a future lateral error that is an error between the setpoint trajectory La and a predictive position of the vehicle after a predetermined period of time has elapsed and is calculated based on predefined vehicle state quantities. In the primary predictive model, a linear expression with the vehicle state quantities as variables is used, where the linear expression represents a relationship between the future lateral error and the vehicle state quantities. In the secondary predictive model, a quadratic expression with the vehicle state quantities as variables is used, where the quadratic expression represents a relationship between the future lateral error and the vehicle state quantities.

(M4) The configuration of the driving aid ECU 50 of the second embodiment and the configuration of the driving aid ECU 50 of the third embodiment may be combined.

(M5) The method used by the road curvature calculator 551 to calculate the road curvature ρ may be changed as appropriate. For example, the road curvature calculator 551 may detect the road curvature ρ based on lane lines detected by a laser radar device or a millimeter-wave radar. The current position detector 51 may estimate the road curvature ρ based on a travel speed V detected by the travel speed sensor 41 and a yaw rate Y detected by the yaw rate sensor 42. The current position detector 51 may estimate the road curvature ρ based on the setpoint trajectory La.

(M6) The method used by the lateral error calculator 54 to calculate the lateral error ΔH may be changed as appropriate. For example, the lateral error calculator 54 may calculate the lateral error ΔH using a laser radar device or the like.

(M7) Instead of using the road curvature ρ, the driving aid ECU 50 may use various parameters correlated with the road curvature ρ, such as a curvature radius of the road.

(M8) The method used by the setpoint trajectory setter 52 to set the setpoint trajectory La may be changed as appropriate. For example, to support a lane change, the setpoint trajectory setter 52 may set the setpoint trajectory La to cross a lane line between different lanes. The setpoint trajectory setter 52 may detect an obstacle to travel of the vehicle based on the current position Pc, the map data M, and the image data I, and may set the setpoint trajectory La that can avoid the obstacle. The setpoint trajectory setter 52 may calculate a plurality of setpoint trajectory La candidates and then select one of the plurality of setpoint trajectory La candidates as a setpoint trajectory La to be traveled.

(M9) In the embodiments described above, the map database 30 used in the driving aid system 10 is a database mounted in a vehicle. Alternatively, the map database 30 may be a map database that is registered in and downloaded from a server.

(M10) The steering angle controller 60 is a device to correct the travel trajectory of the vehicle by generating a yaw moment applied to the vehicle. Such a device is not limited to the steering angle controller 60. Instead of using the steering angle controller 60, a device may be used that is configured to change the distribution of driving or braking forces to the wheels of the vehicle to thereby generate a yaw moment applied to the vehicle.

(M11) In each of the embodiments described above, the driving aid ECU 50 calculates the steering angle command value δ. Alternatively, the driving aid ECU 50 may calculate an arbitrary control command value that allows a steering angle of the vehicle to be controlled. Such a control command value may include a control command value of assistive torque to be applied from a motor to a steering shaft. In addition, types of the first and second control command values respectively calculated by the first control command value calculator 53 and the second control command value calculator 55 may be changed depending on a type of control command value calculated by the driving aid ECU 50.

(M12) The method used by the driving aid ECU 50 to detect the travel speed V and the yaw rate Y may be changed as appropriate. For example, the driving aid ECU 50 may detect the travel speed V using a GNSS speedometer. Alternatively, the driving aid ECU 50 may detect the travel speed V based on an absolute speed acquired from the image data I of the camera 22. The driving aid ECU 50 may detect the yaw rate Y based on a speed difference between the left and right wheels.

(M13) In the embodiments described above, the driving aid ECU 50 is applied to every automobile. Alternatively, the driving aid ECU 50 configured as above may be applied to any other type of vehicle, such as a motorcycle or a bicycle.

(M14) The means and/or functions provided by the driving aid ECU 50 can be provided by software stored in a non-transitory computer-readable storage medium and a computer executing it, software only, hardware only, or a combination thereof. For example, when the driving aid ECU 50 is provided by an electronic circuit which is hardware, it can be provided by a digital circuit including a number of logic circuits or an analog circuit.

(M15) The embodiments of the present disclosure have been described with reference to specific examples. However, the disclosure is not limited to those specific examples. Any design modification applied to such specific examples by a person skilled in the art is encompassed in the scope of the present disclosure, as long as it has the features of the present disclosure. Elements included in each of the above-mentioned specific examples, as well as the arrangement, are not limited to those illustrated in the specific examples and may be arbitrarily changed.

What is claimed is:

1. An apparatus for performing driving aid control to cause a travel trajectory of a mobile object to follow a setpoint trajectory, the apparatus comprising:
    a central processing unit configured to:
        set the setpoint trajectory of the mobile object;
        calculate an integrated value of a lateral error, the lateral error being an error between a current position of the mobile object and the setpoint trajectory;
        determine a decremental gain changeable by a curvature of the a that the mobile object is traveling on;
        calculate a final integrated value by multiplying the integrated value of the lateral error by the decremental gain; and
        calculate, using the final integrated value, a control command value used for controlling a yaw moment of the mobile object; and
    a memory configured to store a program which is performed by the central processing unit, wherein the central processing unit is configured to reset the integrated value in response to the curvature of the road being equal to or less than a first curvature, and determine the decremental gain such that the decremental gain decreases as the curvature of the road decreases in response to the curvature of the road being less than a second curvature which is greater than the first curvature.

2. The apparatus according to claim 1, wherein the central processing unit is configured to reset the integrated value in response to the final integrated value obtained by multiplying the integrated value of the lateral error by the decremental gain being equal to or less than a reset threshold.

3. The apparatus according to claim 1, wherein the central processing unit is configured to calculate the decremental gain based on a ratio of the curvature of the road to a second curvature.

4. The apparatus according to claim 3, wherein the central processing unit is configured to set the second curvature based on a travel speed of the mobile object.

5. The apparatus according to claim 1, wherein the central processing unit is configured to calculate the decremental gain based on a ratio of the curvature of the road to a maximum curvature of the road.

6. The apparatus according to claim 1, wherein
the control command value is a steering angle command value for the mobile object,
the final integrated value obtained by multiplying the integrated value of the lateral error by the decremental gain is referred to as a second control command value,
the central processing unit is configured to calculate the control command value based on a first control command value and the second control command value, the first control command value being a first steering angle command value by performing feedforward control based on a future target position of the mobile object on the setpoint trajectory, the second control command value being calculated using the decremental gain determined based on the first steering angle command value.

7. The apparatus according to claim 6, wherein the central processing unit is configured to calculate the decremental gain based on a ratio of the first steering angle command value to a start-of-decrease steering angle.

8. The apparatus according to claim 1, wherein the central processing unit transmits the control command value to a yaw moment controller configured to control the yaw moment of the mobile object.

9. The apparatus according to claim 1, wherein the lateral error is calculated as a difference between the current position of the mobile object and one of i) a first position on the setpoint trajectory of the mobile object that is closest to the current position of the mobile object, and ii) a second position on the setpoint trajectory of the mobile object that intersects an axis laterally extending from the current position of the mobile object.

10. The apparatus according to claim 1, wherein the central processing unit is configured to reset the integrated value to zero.

11. The apparatus according to claim 1, wherein the central processing unit is configured to determine the decremental gain as 1 based on the curvature of the road being equal to or greater than a second curvature which is greater than a first curvature, and determine the decremental gain as a value less than 1 based on the curvature of the road being lower than the second curvature.

12. The apparatus according to claim 4, wherein the central processing unit is configured to set the second curvature such that the second curvature decreases as the travel speed of the mobile object increases.

13. A method for performing driving aid control to cause a travel trajectory of a mobile object to follow a setpoint trajectory, the method comprising:
setting the setpoint trajectory of the mobile object;
calculating an integrated value of a lateral error, the lateral error being an error between a current position of the mobile object and the setpoint trajectory;
determining a decremental gain changeable by a curvature of a road that the mobile object is traveling on;
calculating a final integrated value by multiplying the integrated value of the lateral error by the decremental gain; and
calculating a control command value using the final integrated value, the control command value used for controlling a yaw moment of the mobile object,
wherein
the integrated value is reset in response to the curvature of the road being equal to or less than a first curvature, and
the decremental gain is determined such that the decremental gain decreases as the curvature of the road decreases in response to the curvature of the road being less than a second curvature which is greater than the first curvature.

14. The apparatus according to claim 1, wherein at least one of the current position and the setpoint trajectory of the mobile object is determined based on map data.

* * * * *